US008741125B2

(12) United States Patent
Tano et al.

(10) Patent No.: US 8,741,125 B2
(45) Date of Patent: *Jun. 3, 2014

(54) RAW OIL COMPOSITION FOR NEGATIVE ELECTRODE MATERIAL FOR LITHIUM ION SECONDARY BATTERY

(75) Inventors: Tamotsu Tano, Tokyo (JP); Takashi Oyama, Tokyo (JP); Ippei Fujinaga, Tokyo (JP); Masayuki Tasaki, Tokyo (JP); Akio Sakamoto, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 244 days.

This patent is subject to a terminal disclaimer.

(21) Appl. No.: 13/140,057

(22) PCT Filed: Dec. 25, 2009

(86) PCT No.: PCT/JP2009/071641
§ 371 (c)(1),
(2), (4) Date: Jul. 29, 2011

(87) PCT Pub. No.: WO2010/074247
PCT Pub. Date: Jul. 1, 2010

(65) Prior Publication Data
US 2011/0288351 A1 Nov. 24, 2011

(30) Foreign Application Priority Data
Dec. 26, 2008 (JP) ................ P2008-334238

(51) Int. Cl.
*C10B 57/04* (2006.01)
*C10M 101/00* (2006.01)

(52) U.S. Cl.
USPC ......... 208/14; 208/22; 208/23; 585/1; 585/24

(58) Field of Classification Search
USPC .................... 208/14, 22, 23, 50, 53
See application file for complete search history.

(56) References Cited

U.S. PATENT DOCUMENTS

| | | | | |
|---|---|---|---|---|
| 5,695,631 A * | 12/1997 | Eguchi et al. | ................... | 208/50 |
| 7,604,731 B2 * | 10/2009 | Bhattacharyya et al. | ....... | 208/67 |
| 7,959,888 B2 * | 6/2011 | Oyama et al. | ............. | 423/445 R |
| 7,964,173 B2 * | 6/2011 | Oyama et al. | ............. | 423/445 R |
| 8,007,658 B2 * | 8/2011 | Miller et al. | ................... | 208/44 |
| 8,007,659 B2 * | 8/2011 | Miller et al. | ................... | 208/44 |
| 8,007,660 B2 * | 8/2011 | Miller et al. | ................... | 208/50 |
| 8,137,530 B2 * | 3/2012 | Tano et al. | ................... | 208/14 |
| 8,197,788 B2 * | 6/2012 | Oyama et al. | ............. | 423/445 R |
| 8,226,921 B2 * | 7/2012 | Oyama et al. | ............. | 423/445 R |
| 2010/0266479 A1 | 10/2010 | Tano et al. | | |
| 2011/0186478 A1 | 8/2011 | Tano et al. | | |

FOREIGN PATENT DOCUMENTS

| | | |
|---|---|---|
| CN | 85107441 | 4/1986 |
| CN | 1245197 | 2/2000 |
| CN | 1382761 | 12/2002 |
| EP | 2 336 267 | 6/2011 |
| JP | 4-024831 | 4/1987 |
| JP | 6-187991 | 7/1994 |
| JP | 8-339797 | 12/1996 |
| JP | 3056519 | 4/2000 |
| JP | 2002-362914 | 12/2002 |
| JP | 2005-200276 | 7/2005 |
| JP | 2006-066334 | 3/2006 |
| JP | 2006-252817 | 9/2006 |
| JP | 2007-019257 | 1/2007 |
| JP | 2009-117256 | 5/2009 |
| WO | 2009/060891 | 5/2009 |

OTHER PUBLICATIONS

Office Action in foreign counterpart 2009801526505, received on Apr. 15, 2013.
International Search Report for PCT/JP2009/071641, mail date is Feb. 16, 2010.
International Preliminary Report on Patentability for PCT/JP2009/071641, mail date is Aug. 25, 2011.
Search Report from EP Patent Application No. 09835043.2, mailed on Jun. 6, 2013.
Notice of Allowance for JP Patent Application No. P2010-544167, mailed on Oct. 1, 2013.

* cited by examiner

*Primary Examiner* — Ellen McAvoy
(74) *Attorney, Agent, or Firm* — Greenblum & Bernstein, P.L.C.

(57) ABSTRACT

The invention provides a stock oil composition for a carbon material for a negative electrode for a lithium ion secondary battery, having a 10 vol % distillation temperature of 280° C. or higher as the distillation property, a density of at least 0.90 g/cm$^3$ at a temperature of 15° C. and a normal paraffin content of at least 3 parts by weight with respect to 100 parts by weight as the total weight of the stock oil composition; and having an aromatic component content of 30-85 parts by weight with respect to 100 parts by weight as the total weight of the stock oil composition and an aromatic component molecular weight of 250-1600 when the aromatic components and non-aromatic components are separated by elution chromatography.

12 Claims, No Drawings

RAW OIL COMPOSITION FOR NEGATIVE ELECTRODE MATERIAL FOR LITHIUM ION SECONDARY BATTERY

TECHNICAL FIELD

The present invention relates to a stock oil composition to serve as a raw material for a negative electrode material for a lithium ion secondary battery.

BACKGROUND ART

Lithium ion secondary batteries have lighter weight and more excellent input/output characteristics than conventional secondary batteries such as nickel cadmium cells, nickel hydrogen cells and lead-acid batteries and have therefore been considered promising in recent years as power sources for electric vehicles and hybrid vehicles. Carbon materials are used as active materials in lithium ion secondary battery electrodes, and have been extensively studied with the aim of increasing lithium ion secondary battery performance (see Patent documents 1 and 2, for example).

Carbon materials used as negative electrode materials in lithium ion secondary batteries are generally classified as either graphite or amorphous. Graphite carbon materials have the advantage of high energy density per unit volume compared to amorphous carbon materials. For this reason, graphite carbon materials are widely used as negative electrode materials in lithium ion secondary batteries for cellular phones and laptop computers that are compact and require large service capacities. Graphite has a structure with layers of carbon atoms regularly arranged in a hexagonal mesh, and during charge-discharge, intercalation-deintercalation of lithium ions takes place at the edges of the hexagonal mesh.

CITATION LIST

[Patent document 1] Japanese Patent Publication No. 3056519

[Patent document 2] Japanese Examined Patent Application Publication HEI No. 4-24831

SUMMARY OF INVENTION

Technical Problem

However, while increased energy densities per unit volume are obtained as mentioned above when graphite carbon materials are used as negative electrode materials in lithium ion secondary batteries, the high-speed charge-discharge characteristics, and especially the high-speed charge characteristic, are still in need of improvement for application to automobiles such as hybrid vehicles. This is due primarily to the fact that the high crystallinity of the graphite carbon material limits diffusion of solvated lithium ions in the carbon layer when it is used as the negative electrode material in a lithium ion secondary battery.

The present invention has been accomplished in light of these circumstances, and its object is to provide a stock oil composition for a negative electrode material for a lithium ion secondary battery which is useful for achieving excellent high-speed charge-discharge characteristics for lithium ion secondary batteries.

Solution to Problem

For production of a lithium ion secondary battery with high charge-discharge capacity and excellent high-speed charge-discharge characteristics, it is essential to use a carbon material with a highly developed crystal structure as the negative electrode material, and to form numerous rows of solvated lithium ion diffusion channels in the carbon layer. In other words, surface development of the carbon layer and formation of more highly ordered carbon edges are necessary.

The present inventors have studied carbon materials with excellent crystal structures, focusing on the mechanism of formation of the crystal structures. For example, needle coke is produced by a process in which heavy oil is subjected to high-temperature treatment to cause thermal decomposition and polycondensation reaction, producing liquid crystal spheres referred to as the "mesophase", which associate to produce large liquid crystals known as the "bulk mesophase" as an intermediate product. The present inventors have extensively studied effects on crystal structure by stock oil compositions and raw material charcoal compositions used in production of carbon materials.

These studies have led the present inventors to understand that, in order to obtain a lithium ion secondary battery exhibiting the required performance described above, it is effective to use a stock oil composition having a specific composition comprising a mixture of a heavy oil containing an aromatic component that is useful for generating a satisfactory bulk mesophase and that has a low content of components which cause production of substances having isotropy that do not form a mesophase during the coking process, known as "non-mesogens", and a heavy oil that can generate gas that contributes to formation of lithium ion diffusion channels in the carbon layer when the bulk mesophase undergoes polycondensation to carbonization and solidification. The present inventors have completed the invention described below based on this understanding.

Specifically, the stock oil composition for a carbon material for a negative electrode for a lithium ion secondary battery according to the invention has a 10 vol % distillation temperature of 280° C. or higher as the distillation property and a normal paraffin content of at least 3 parts by weight with respect to 100 parts by weight as the total weight of the stock oil composition; and has an aromatic component content of 30-85 parts by weight with respect to 100 parts by weight as the total weight of the stock oil composition and an aromatic component molecular weight of 250-1600 when the aromatic components and non-aromatic components are separated by elution chromatography.

An excellent high-speed charge-discharge characteristic is exhibited by a lithium ion secondary battery using as the negative electrode a carbon material prepared from the stock oil composition having such a composition. The major reason for this is conjectured to be that sufficient lithium ion diffusion channels are formed in the carbon layer by production of a satisfactory mesophase in the thermal decomposition and polycondensation reactions during the coking process for the stock oil composition, and generation of a suitable amount of gas during bulk mesophase formation and solidification.

The stock oil composition of the invention preferably has a density of at least $0.90$ g/cm$^3$ at a temperature of 15° C., from the viewpoint of achieving high yield. Furthermore, the stock oil composition of the invention preferably has a normal paraffin content in the non-aromatic components of at least 5 parts by weight with respect to 100 parts by weight of the aromatic components, from the viewpoint of obtaining a large charge capacity for a lithium secondary battery.

Advantageous Effects of Invention

According to the invention there is provided a stock oil composition for a negative electrode material for a lithium ion secondary battery which is useful for achieving excellent high-speed charge-discharge characteristics for lithium ion secondary batteries.

DESCRIPTION OF EMBODIMENTS

The stock oil composition according to this embodiment has a 10 vol % distillation temperature of 280° C. or higher as the distillation property and a normal paraffin content of at least 3 parts by weight with respect to 100 parts by weight as the total weight of the stock oil composition; and has an aromatic component content of 30-85 parts by weight with respect to 100 parts by weight as the total weight of the stock oil composition and an aromatic component molecular weight of 250-1600 when the aromatic components and non-aromatic components are separated by elution chromatography.

The term "10 vol % distillation temperature" according to the invention means the value measured according to JIS (Japanese Industrial Standards) K2254, "Petroleum Products—Distillation Test Methods".

"Elution chromatography", according to the invention, is a method of separation of a stock oil composition into two components (the aromatic component and non-aromatic component), according to the method described by ASTM (American Society for Testing Materials) D2549. Specifically, 8 g of the stock oil composition dissolved in 20 mL of n-pentane or cyclohexane is passed through a column packed with active alumina and silica gels. Next, 130 mL of n-pentane is passed through the column at a speed of 3 mL/min, for elution of the non-aromatic component into the n-pentane. The non-aromatic component eluted into the n-pentane is recovered and quantitated. Next, 100 mL of diethyl ether, 100 mL of chloroform and 175 mL of ethyl alcohol as solvents are passed through the column in that order at a speed of 3 mL/min, for elution of the aromatic component into the solvents. The non-aromatic component eluted into the solvents is recovered and quantitated.

The aromatic and non-aromatic component contents with respect to the total weight of the stock oil composition are the values calculated by the following formulas (1) and (2), respectively. In the formulas, A and B represent the aromatic component and non-aromatic component, respectively, obtained by separation treatment by the elution chromatography.

Aromatic component content (parts by weight)=$A/(A+B) \times 100$: (1)

Non-aromatic component content (parts by weight) =$B/(A+B) \times 100$: (2)

The term "aromatic component molecular weight", according to the invention, refers to the value determined by a vapor pressure equilibrium method. Specifically, using a molecular weight measuring apparatus (for example, Model 117 by Hitachi, Ltd.), n-cetane used as the reference sample with known molecular weight is dissolved in cyclohexane and injected into the measuring apparatus, and a calibration curve is drawn for the relationship between molar concentration and difference in potential. Next, the aromatic component sample is measured in the same manner as the reference sample, the molar concentration is determined from the difference in potential, and the average molecular weight is calculated.

The normal paraffin content of the stock oil composition is the value measured using a capillary column-mounted gas chromatograph. Specifically, after verification of normal paraffins with a standard substance, a non-aromatic component sample separated by elution chromatography is passed through the capillary column for measurement. The content is calculated from this measured value based on the total weight of the stock oil composition.

The stock oil composition of this embodiment has a 10 vol % distillation temperature, as the distillation property, of 280° C. or higher, preferably 300° C. or higher and more preferably 330° C. or higher. A carbon material produced from a stock oil composition with a 10 vol % distillation temperature of below 280° C. will not allow sufficient uptake of lithium ions during charge and will result in inadequate charge capacity. This is because the low-molecular-weight components in the fraction with a distillation temperature of below 280° C. may be converted to coke, which contains large amounts of components with isotropy that do not form a mesophase during the coking process, known as "non-mesogens", and can adversely affect the orientation of the carbon layer surface during the carbonization/graphitization process.

The aromatic component content with respect to 100 parts by weight as the total weight of the stock oil composition is 30-85 parts by weight as mentioned above, and it is preferably 35-80 parts by weight and more preferably 40-75 parts by weight. This condition is indispensable for production and growth of a satisfactory mesophase. If the aromatic component content is less than 30 parts by weight, the yield of coke from the stock oil composition will be drastically reduced. On the other hand, an aromatic component content of greater than 85 parts by weight results in a drastic increase in mesophase generation in the matrix during the course of coke production. This will cause coalescence of mesophases instead of single growth of itself, thus resulting in deformation of the coke structure and poor orientation of the carbon layer surface in the subsequent carbonization/graphitization process as well. Using such a material for the negative electrode prevents large uptake of lithium ions during charge and reduces charge capacity, and is therefore undesirable.

The molecular weight of the aromatic component is 250-1600 as mentioned above, but it is preferably 280-1500 and more preferably 300-1400. This condition is indispensable for production and growth of a satisfactory mesophase. If the aromatic component molecular weight is less than 250, mesophase production will be inadequate. If the aromatic component molecular weight is greater than 1600, on the other hand, the mesophase will be prematurely generated during the coke production process, thus promoting coke formation before mesophase growth so that coke with a small "mosaic" structure is obtained. Such coke does not develop the carbon layer surface even after carbonization/graphitization, and has an excessively large number of highly reactive edge surfaces. When such a material is used for a negative electrode, gas is generated by reaction between the electrolyte solution and the carbon edge surfaces, and this is undesirable.

Normal paraffins that are appropriately contained in the stock oil composition are effective for orienting the crystals along the uniaxial direction during solidification of the mesophase in the coke production process. The normal paraffin content with respect to 100 parts by weight as the total weight of the stock oil composition is 3 parts by weight or greater as mentioned above, and it is preferably 4 parts by weight or greater and even more preferably 5 parts by weight or greater. If the normal paraffin content is less than 3 parts by weight, it will not be possible to sufficiently orient the mesophase along the uniaxial direction, resulting in an undesirable random structure. The normal paraffin content is preferably no greater than 45 parts by weight and more preferably no greater than 40 parts by weight. If the normal paraffin content exceeds 45 parts by weight, gas generated from the normal paraffins will be excessive and will tend to push the orientation of the bulk mesophase instead in a random direction. This will result in poor orientation of the carbon layer surface even in the carbonization/graphitization process, preventing large uptake of lithium ions during charge and reducing charge capacity, which is undesirable.

From the same viewpoint, the normal paraffin content is preferably at least 5 parts by weight, more preferably at least 7-50 parts by weight and even more preferably at least 8-45 parts by weight with respect to 100 parts by weight of the aromatic component as the main component of the mesophase production by thermal decomposition and polycondensation reaction.

The stock oil composition of this embodiment has a density of at least 0.90 g/cm$^3$ and more preferably at least 0.91 g/cm$^3$, at a temperature of 15° C. If the density at a temperature of 15° C. is less than 0.90 g/cm$^3$, the coke yield from the stock oil composition will be excessively low, and industrially undesirable. The upper limit for the density of the stock oil composition at a temperature of 15° C. is preferably 1.07 g/cm$^3$, more preferably 1.05 g/cm$^3$ and even more preferably 1.03 g/cm$^3$. If the density exceeds 1.07 g/cm$^3$, abrupt coking will tend to occur, leading to obstruction in the heating furnace tubes and the like, which is undesirable in terms of industrial operation. The density referred to here is the density measured according to JIS K2249, "Crude Oil and Petroleum Product Density Test Method and Density/Weight/Volume Conversion Table".

The stock oil composition of this embodiment can be obtained by treating the stock oil alone so that the aforementioned conditions are satisfied, or by blending two different types of stock oils so that the conditions are satisfied. The stock oil may be bottom oil of fluidized catalytic cracking oil (FCC DO), highly hydrodesulfurized heavy oil, vacuum residual oil (VR), coal liquefaction oil, coal solvent extraction oil, ordinary pressure residue oil, shale oil, tar sand bitumen, naphtha tar pitch, coal tar pitch and heavy oil form hydrorefining of the foregoing. Heavy oil that has been subjected to high-level hydrodesulfurization treatment and contains a suitable level of saturated components and a suitable level of normal paraffins in the components, is preferably used as the gas generating source during solidification. When two or more stock oils are blended to prepare the stock oil composition, the blending ratio may be appropriately adjusted according to the properties of the stock oils used. The stock oil properties will vary depending on the type of crude oil and on the treatment conditions employed until the stock oil is obtained from the crude oil.

The stock oil composition of this embodiment may be subjected to coking and if necessary heat treatment and artificial graphitization, for use as a carbon material for a negative electrode for a lithium ion secondary battery. The method for coking the stock oil composition satisfying the prescribed conditions is preferably a delayed coking method. More specifically, the stock oil composition is heat treated under pressurized conditions in a delayed coker to obtain raw coke. The conditions in the delayed coker are preferably a pressure of 300-800 kPa and a temperature of 400-600° C. There are no particular restrictions on the carbonization/graphitization conditions, but the raw coke may be fired in a rotary kiln, shaft kiln or the like at 1000-1500° C. to obtain calcined coke, which is subjected to graphitizing in an Acheson furnace or the like at 2150-2750° C.

By using a stock oil composition of this embodiment it is possible to produce a carbon material for a negative electrode for a lithium ion secondary battery that is particularly suitable for high-speed charge-discharge. In addition, separation of the stock oil composition used into the aromatic component and non-aromatic component by elution chromatography and analysis of the stock oil composition (aromatic component content, aromatic component molecular weight and normal paraffin content of the non-aromatic component) allows efficient selection of a stock oil composition suitable for production of a carbon material for a negative electrode for a lithium ion secondary battery suitable for high-speed charge-discharge.

The following explanation concerns a method for producing a negative electrode for a lithium ion secondary battery using a carbon material obtained from a stock oil composition, as well as a lithium ion secondary battery.

There are no particular restrictions on the method for producing the negative electrode for the lithium ion secondary battery, and for example, the method may involve pressure molding of a mixture comprising the carbon material of this embodiment, a binder and if necessary a conductive aid and organic solvent. As an alternative method, there may be mentioned a method of forming the carbon material, a binder and a conductive aid into a slurry in an organic solvent, coating the slurry onto a collector and then drying it.

The binder may be polyvinylidene fluoride, polytetrafluoroethylene, SBR (styrene-butadiene rubber) or the like. A suitable amount of binder is 1-30 parts by weight, with about 3-20 parts by weight being preferred, with respect to 100 parts by weight of the carbon material.

The conductive aid may be carbon black, graphite, acetylene black, conductive indium-tin oxide, or a conductive polymer such as polyaniline, polythiophene or polyphenylenevinylene. The amount of conductive aid used is preferably 1-15 parts by weight with respect to 100 parts by weight of the carbon material.

Organic solvents include dimethylformamide, N-methylpyrrolidone, isopropanol and toluene.

The method for mixing the carbon material and binder, and the conductive aid and organic solvent used as necessary, may be a method employing a known apparatus such as a screw-type kneader, ribbon mixer, universal mixer or planetary mixer. The obtained mixture is molded by roll pressing and press pressing. The pressure is preferably about 100-300 MPa.

The material and form of the collector are not particularly restricted, and for example, aluminum, copper, nickel, titanium, stainless steel or the like may be used as a foil, perforated foil or mesh, and formed as a band. A porous material such as a porous metal (metal foam) or carbon paper may also be used as the collector.

The method for coating the negative electrode material slurry onto the collector is not particularly restricted, and as examples there may be mentioned known methods such as metal mask printing, electrostatic coating method, dip coating, spray coating, roll coating, doctor blading, gravure coating, screen printing and the like. The coating may be followed by rolling treatment with a flat press or calender roll, if necessary.

Also, integration of the collector with a slurry molded into the form of a sheet, pellets or the like may be carried out by a known method using, for example, a roll or press, or a combination thereof.

A lithium ion secondary battery according to this embodiment can be obtained by, for example, situating a negative electrode for a lithium ion secondary battery, produced in the manner described above, opposite a positive electrode via a separator, and injecting an electrolyte solution between them.

There are no particular restrictions on the active material used for the positive electrode, and for example, a metal compound, metal oxide, metal sulfide or conductive polymer material capable of doping or intercalation with lithium ions may be used, examples of which include lithium cobaltate ($LiCoO_2$), lithium nickelate ($LiNiO_2$), lithium manganate ($LiMnO_2$), complex oxides of the foregoing ($LiCO_XNi_YM_nZO_2$, X+Y+Z=1), lithium manganese spinel ($LiMn_2O_4$), lithium vanadium compounds, $V_2O_5$, $V_6O_{13}$, $VO_2$, $MnO_2$, $MnO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni, Mn, Fe), conductive polymers such as polyacetylene, polyaniline, polypyrrole, polythiophene and polyacene, porous carbon, and mixtures of the foregoing.

Examples of separators to be used include nonwoven fabrics, cloths and microporous films composed mainly of polyolefins such as polyethylene or polypropylene, as well as combinations thereof. It is not necessary to use a separator if the positive electrode and negative electrode of the lithium ion secondary battery to be fabricated will not be in direct contact.

The electrolyte solution and electrolytes used in the lithium ion secondary battery may be a publicly known organic electrolyte solution, inorganic solid electrolytes or polymer solid electrolytes. An organic electrolyte solution is preferred from the viewpoint of electrical conductivity.

For organic electrolyte solutions there may be mentioned organic solvents including ethers such as dibutyl ether, ethyleneglycol monomethyl ether, ethyleneglycol monoethyl ether, ethyleneglycol monobutyl ether, diethyleneglycol monomethyl ether and ethyleneglycol phenyl ether; amides such as N-methylformamide, N,N-dimethylformamide, N-ethylformamide, N,N-diethylformamide, N-methylacetamide, N,N-dimethylacetamide, N-ethylacetamide and N,N-diethylacetamide, sulfur-containing compounds such as dimethyl sulfoxide and sulfolane; dialkylketones such as methyl ethyl ketone and methyl isobutyl ketone; cyclic ethers such as tetrahydrofuran and 2-methoxytetrahydrofuran; carbonates such as ethylene carbonate, butylene carbonate, diethyl carbonate, dimethyl carbonate, methylethyl carbonate, propylene carbonate and vinylene carbonate; γ-butyrolactone; N-methylpyrrolidone; acetonitrile, nitromethane and the like. Preferred examples among these include ethylene carbonate, butylene carbonate, diethyl carbonate, dimethyl carbonate, methylethyl carbonate, propylene carbonate, vinylene carbonate, γ-butyrolactone, diethoxyethane, dimethyl sulfoxide, acetonitrile and tetrahydrofuran, with particularly preferred examples including carbonate-based non-aqueous solvents such as ethylene carbonate and propylene carbonate. Any of these solvents may be used alone, or two or more thereof may be used in admixture.

Lithium salts are used as solutes (electrolytes) in these solvents. Lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$ and $LiN(CF_3SO_2)_2$.

As polymer solid electrolytes there may be mentioned polyethylene oxide derivatives and polymers comprising those derivatives, polypropylene oxide derivatives and polymers comprising those derivatives, phosphoric acid ester polymers, and polycarbonate derivatives and polymers comprising those derivatives.

There are absolutely no restrictions on selection of any of the other members required for construction of the battery.

There are also no restrictions on the structure of the lithium ion secondary battery employing a carbon material according to this embodiment as the negative electrode material, but normally it will have a structure comprising a positive electrode and negative electrode, with a separator if necessary, wrapped up in a flat spiral fashion as a rolled polar plate group, or stacked as plates into a layered polar plate group, with the polar plate group being sealed in an outer casing. Lithium ion secondary batteries are used as paper batteries, button batteries, coin batteries, stacked cells, cylindrical cells and the like.

A lithium ion secondary battery employing a carbon material for the negative electrode of a lithium ion secondary battery according to this embodiment has excellent rapid charge-discharge characteristics compared to a lithium ion secondary battery employing a conventional carbon material, and it can be used in automobiles, for example in hybrid vehicles, plug-in hybrid vehicles and electric vehicles.

EXAMPLES

The present invention will now be explained in greater detail based on examples and comparative examples, with the understanding that these examples are in no way limitative on the invention.

Examples 1-3 and Comparative Examples 1-4

(1) Production of Carbon Material for Negative Electrode for Lithium Ion Secondary Battery Different heavy oils were blended to prepare 7 different stock oil compositions. More specifically, the stock oil compositions of Examples 1-3 were each prepared by blending bottom oil of fluidized catalytic cracking oil, highly-hydrodesulfurized heavy oil and low-sulfur vacuum residual oil. The stock oil compositions of Comparative Examples 1-4 were each prepared using naphtha tar or petroleum-based heavy distilled oil and high-sulfur vacuum residual oil. The 7 stock oil compositions were each separated by elution chromatography and analyzed, giving the results shown in Tables 1 and 2.

Each stock oil composition was also heat treated at 500° C. for 3 hours to form raw coke, and the obtained raw coke was fired at 1000° C. for 1 hour to obtain calcined coke (needle coke). The calcined coke was further subjected to graphitizing at 2400° C. for 5 minutes to obtain carbon material for a negative electrode for a lithium ion secondary battery.

(2) Evaluation of Negative Electrode Material Charge-Discharge (a) Fabrication of Negative Electrode Fine particles of a carbon material for a negative electrode of a lithium ion secondary battery as the active material, acetylene black (AB) as the conductive material and polyvinylidene fluoride (PVDF) as the binder were combined in N-methyl-2-pyrrolidone at a ratio of 80:10:10 (weight ratio) to prepare a slurry. The slurry was coated onto a copper foil and dried for 10 minutes with a hot plate, and then press molded with a roll press.

(b) Fabrication of Evaluation Cell

There were used the aforementioned composition (30×50 mm) as the negative electrode, lithium nickelate (30×50 mm) as the positive electrode, a mixture of ethylene carbonate (EC)/methyl ethyl carbonate (MEC) (EC/MEC weight ratio: 3/7, solute: $LiPF_6$ (1 M volume molar concentration)) as the electrolyte solution and a polyethylene porous film as the separator.

(c) Evaluation of High-Speed Charge-Discharge Characteristics

The measurement results for the high-speed charge-discharge characteristic of the fabricated batteries are shown in Tables 1 and 2. The C rate for the evaluation was 10 C.

As shown in Table 1, the stock oil compositions of Examples 1-3 satisfied the conditions of a normal paraffin content of 3 parts by weight or greater and an aromatic component content of 30-85 parts by weight with respect to 100 parts by weight of the total, and an aromatic component molecular weight of 250-1600. As shown in Table 2, the stock oil compositions of Comparative Examples 1-4 did not satisfy those conditions. The lithium ion secondary batteries employing carbon materials produced from the stock oil compositions of Examples 1-3 as the negative electrodes had a satisfactory balance between both charge capacity and service capacity under high-speed charge-discharge conditions (10 C), compared to those employing carbon materials produced form the stock oil compositions of Comparative Examples 1-4 as the negative electrodes.

TABLE 1

|  |  | Example 1 | Example 2 | Example 3 |
|---|---|---|---|---|
| Density at 15° C. (g/cm³) | | 0.9637 | 0.9212 | 0.9591 |
| 10 Vol % distillation temperature (° C.) | | 334 | 384 | 430 |
| Aromatic component | Content (parts by wt.) | 60 | 42 | 51 |
| | Molecular weight | 300 | 530 | 1400 |
| Non-aromatic component | Content (parts by wt.) | 40 | 58 | 49 |
| Normal paraffin content (parts by wt.) | | 5 | 15 | 20 |
| Normal paraffin content based on aromatic component weight (parts by wt.) | | 8 | 36 | 39 |
| Evaluation results | High-speed charge characteristic | Charge capacity (mAh) | 14.5 | 15.2 | 15.2 |
| | | Utilization factor (%) | 77.1 | 80.1 | 77.7 |
| | High-speed discharge characteristic | Discharge capacity (mAh) | 15.2 | 15.6 | 14.9 |
| | | Utilization factor (%) | 83.5 | 82.8 | 78.1 |

The aromatic component contents, non-aromatic component contents and normal paraffin contents in the tables are all based on the total weight of the stock oil composition (100 parts by weight). The "Normal paraffin content based on aromatic component weight" is based on 100 parts by weight of the aromatic component, and is calculated by dividing the value of the normal paraffin content in the table by the value of the aromatic component content.

TABLE 2

|  |  | Comp. Ex. 1 | Comp. Ex. 2 | Comp. Ex. 3 | Comp. Ex. 4 |
|---|---|---|---|---|---|
| Density at 15° C. (g/cm³) | | 1.0722 | 1.0176 | 0.9200 | 0.8853 |
| 10 Vol % distillation temperature (° C.) | | 222 | 318 | 520 | 347 |
| Aromatic component | Content (parts by wt.) | 100 | 78 | 30 | 30 |
| | Molecular weight | 255 | 220 | 2000 | 350 |
| Non-aromatic component | Content (parts by wt.) | 0 | 22 | 70 | 70 |
| Normal paraffin content (parts by wt.) | | 0 | 2 | 21 | 29 |
| Normal paraffin content based on aromatic component weight (parts by wt.) | | 0 | 3 | 70 | 97 |
| Evaluation results | High-speed charge characteristic | Charge capacity (mAh) | 6.3 | 11.6 | 11.9 | 12.3 |
| | | Utilization factor (%) | 40.1 | 74.8 | 79.3 | 73.1 |
| | High-speed discharge characteristic | Discharge capacity (mAh) | 6.5 | 12 | 12.3 | 12.5 |
| | | Utilization factor (%) | 42.3 | 77.9 | 81.8 | 70.3 |

The aromatic component contents, non-aromatic component contents and normal paraffin contents in the tables are all based on the total weight of the stock oil composition (100 parts by weight). The "Normal paraffin content based on aromatic component weight" is based on 100 parts by weight of the aromatic component, and is calculated by dividing the value of the normal paraffin content in the table by the value of the aromatic component content.

Industrial Applicability

According to the invention there is provided a stock oil composition for a negative electrode material for a lithium ion secondary battery which is useful for achieving excellent high-speed charge-discharge characteristics for lithium ion secondary batteries.

The invention claimed is:

1. A stock oil composition for a carbon material for a negative electrode for a lithium ion secondary battery,
    having a 10 vol % distillation temperature of 280° C. or higher as the distillation property, a density of at least 0.90 g/cm³ at a temperature of 15° C. and a normal paraffin content of at least 3 parts by weight with respect to 100 parts by weight as the total weight of the stock oil composition; and
    having an aromatic component content of 30-85parts by weight with respect to 100 parts by weight as the total weight of the stock oil composition and an aromatic component molecular weight of 250-1600 when the aromatic components and non-aromatic components are separated by elution chromatography.

2. The stock oil composition according to claim 1, having a normal paraffin content in the non-aromatic components of at least 5 parts by weight with respect to 100 parts by weight of the aromatic components.

3. The stock oil composition according to claim 2, wherein the normal paraffin content in the non-aromatic components is 7 to 50 parts by weight with respect to 100 parts by weight of the aromatic components.

4. The stock oil composition according to claim 2, wherein the normal paraffin content in the non-aromatic components is 8 to 45 parts by weight with respect to 100 parts by weight of the aromatic components.

5. The stock oil composition according to claim 1, wherein the normal paraffin content is 3 to 45 parts by weight with respect to 100 parts by weight as the total weight of the stock oil composition.

6. The stock oil composition according to claim 1, wherein the normal paraffin content is 3 to 40 parts by weight with respect to 100 parts by weight as the total weight of the stock oil composition.

7. The stock oil composition according to claim 1, wherein the aromatic component content is 35 to 80 parts by weight with respect to 100 parts by weight as the total weight of the stock oil composition.

8. The stock oil composition according to claim 1, wherein the aromatic component content is 40 to 75 parts by weight with respect to 100 parts by weight as the total weight of the stock oil composition.

9. The stock oil composition according to claim 1, wherein the molecular weight of the aromatic component is 280 to 1500.

10. The stock oil composition according to claim 1, wherein the molecular weight of the aromatic component is 300 to 1400.

11. The stock oil composition according to claim 1, wherein the 10 vol % distillation temperature is 300° C. or higher.

12. The stock oil composition according to claim 1, wherein the 10 vol % distillation temperature is 330° C. or higher.

* * * * *